F. E. MEKAN.
ATTACHMENT FOR TRACTORS.
APPLICATION FILED SEPT. 27, 1920.
1,383,225.
Patented June 28, 1921.
2 SHEETS—SHEET 1.
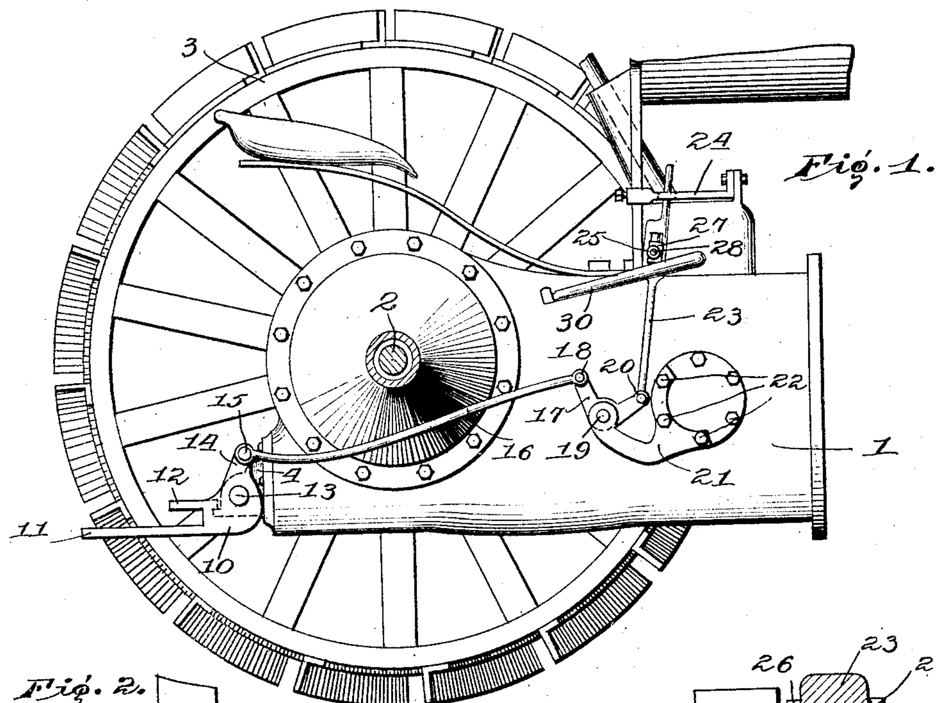
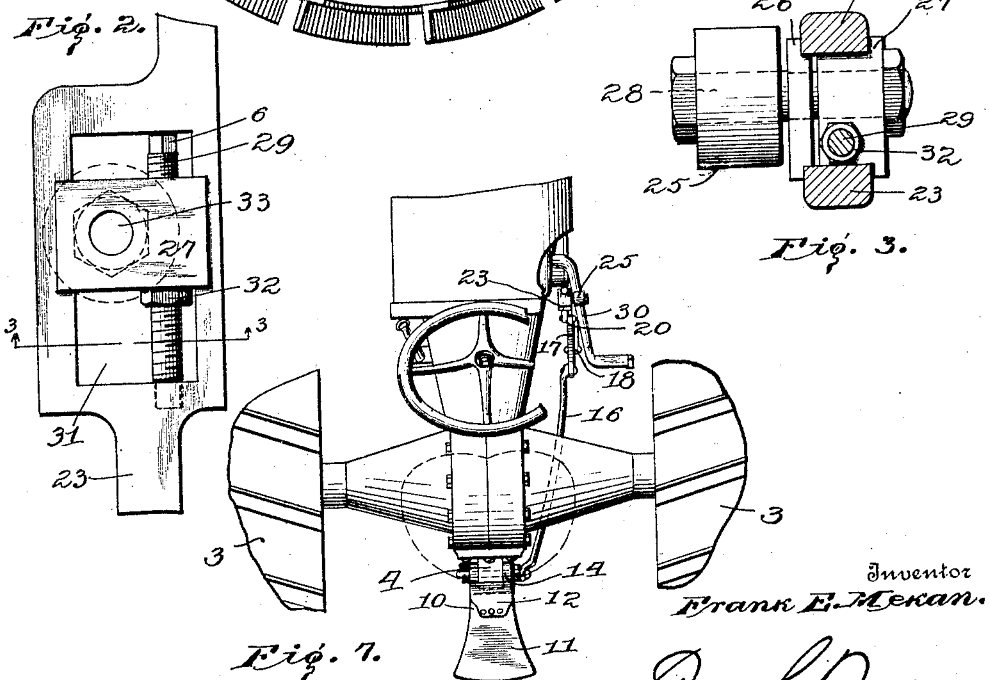
Inventor
Frank E. Mekan.
By [signature]
Attorney F. E. MEKAN.
ATTACHMENT FOR TRACTORS.
APPLICATION FILED SEPT. 27, 1920.
1,383,225. Patented June 28, 1921.
2 SHEETS—SHEET 2.
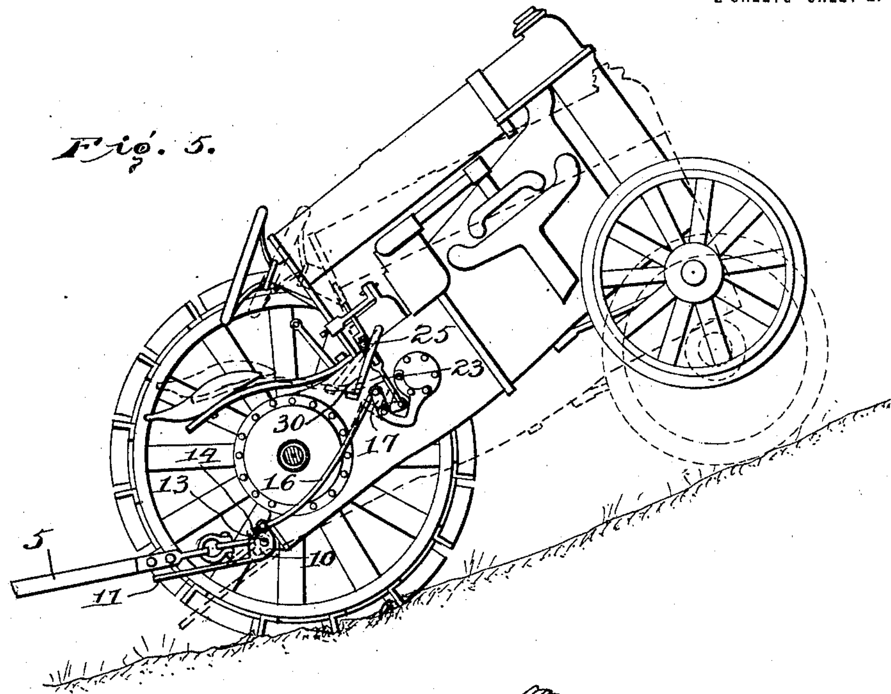
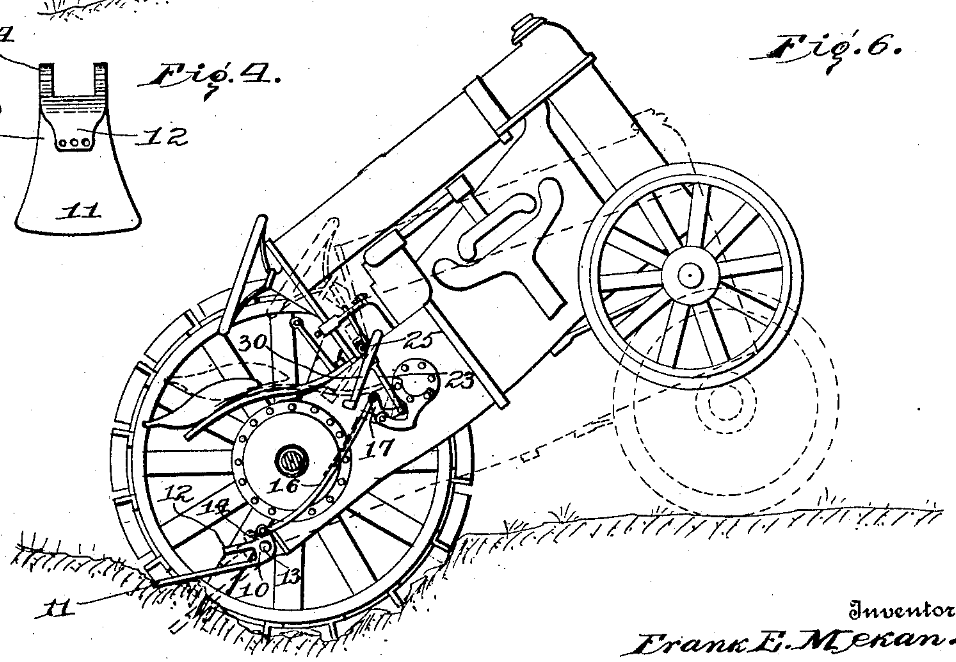
Inventor
Frank E. Mekan.
By [signature]
Attorney

UNITED STATES PATENT OFFICE.

FRANK E. MEKAN, OF DEXTER, MISSOURI.

ATTACHMENT FOR TRACTORS.

1,383,225. Specification of Letters Patent. Patented June 28, 1921.

Application filed September 27, 1920. Serial No. 413,013.

*To all whom it may concern:*

Be it known that I, FRANK E. MEKAN, a citizen of the United States, residing at Dexter, in the county of Stoddard and State of Missouri, have invented new and useful Improvements in Attachments for Tractors, of which the following is a specification.

My invention relates to an attachment for tractors which will prevent the same from rearing backwardly to a dangerous extent. Tractors when pulling a load up a steep incline or when the driving wheels are located in a ditch in soft ground have a tendency to rear backwardly and unless this movement is interrupted it may result in the upsetting of the vehicle or the breaking of parts of the same in the sudden release of the front portion of the vehicle from an elevated position.

My invention provides a device attached to the coupling device of the tractor which is maintained in original position either by the load attached to the tractor or by contact with the surface of the ground, so that the body of the tractor in rearing will move relatively to said coupling device. This relative motion is utilized to move certain of the control devices of the vehicle or of the engine, so that the driving force to the rear wheels is interrupted or diminished and the front wheels of the vehicle are thus permitted to return to normal position.

Reference is made in the following specification to the accompanying drawings, in which:—

Figure 1 is a side elevation of the rear portion of the tractor with one of the driving wheels removed.

Fig. 2 is a side elevation of a portion of the control rod and the roller adjustably supported thereon.

Fig. 3 is a section on the line 3—3 of Fig. 2 looking in the direction of the arrows.

Fig. 4 is a detailed plan view of the coupling device.

Fig. 5 is a side elevation of the tractor attempting to pull a load up a steep incline, the parts being shown in normal position in dotted lines.

Fig. 6 is a side elevation of the tractor, with one of the rear wheels removed, showing a driving wheel in a ditch, the normal position of the parts being shown in dotted lines.

Fig. 7 is a partial plan view of the structure with parts broken away to disclose the operating connections between the coupling device and the control rod.

The numeral 1 designates the frame of the tractor having the rear axle 2 to which is attached the driving wheels 3. To the rear of the frame 1 between the rear wheels 3 is secured a coupling block 4 to which is pivoted my novel coupling device 10 by means of a pin 13 that passes through a forked portion of the body 10 and through a corresponding aperture formed in the coupling block. Two parallel extensions 11 and 12 project rearwardly from the body of the coupling device 10, extension 12 being shorter than the extension 11, and the latter being preferably wedge shaped so as to present a broad flat surface of contact for a purpose which will hereinafter appear. The extension 12 is provided with an aperture adapted to receive a coupling pin for connecting the draw bar 5 of the load through the coupling device 10 to the tractor.

The body portion of the coupling device is preferably in one piece with the extensions 11 and 12, and with an apertured lug 14 which extends upwardly at right angles to said projections. The pivot pin 15 connects one end of the rod 16 to the apertured lug of the coupling device. The other end of the rod 16 is connected to one arm of a bell crank lever 17 by means of a pin 18. The bell crank lever is pivotally supported by means of a pin 19 upon a bracket 21 which is secured to the frame of the tractor by means of the fastening devices 22. A control rod 23 is pivoted to the other arm of the bell crank lever by means of the pin 20 and extends upwardly adjacent the controls of the vehicle, in this case said rod being positioned adjacent the clutch control lever or pedal 30. The control rod 23 passes through an aperture formed in a bracket 24 secured to the frame of the tractor and is guided thereby in its vertical movement.

As shown in Fig. 2, a portion of the control rod 23 in the vicinity of the clutch control 30 is enlarged and provided with an elongated opening having parallel sides. A block 27 is slidably mounted in this opening and is provided with flanges which engage the parallel sides of the opening and retain the block against lateral displacement.

The block 27 is formed with vertical and transverse threaded apertures. In the vertical threaded aperture is mounted a screw bolt 29 having a lock nut 32 mounted thereon and provided with a hexagonal head 6 by which the screw bolt may be rotated in order to vary the vertical position of the block 27 in the opening 31. A stud bolt 28 is threaded in the aperture 33 and secured therein by means of a washer 26 and a retaining nut 34. A roller 25 is mounted on the unthreaded portion of the stud bolt 28 and is adapted to overlie and at the proper times engage the control lever 30 for actuating the clutch of the vehicle to inoperative position. The washer 26 bears at one side on a shoulder formed on the bolt 28 and on the other side against the parallel sides of the opening 31.

It will be seen from the construction above described in connection with the mounting of the roller 25 that the same may be varied both in vertical and horizontal positions so as to compensate for differences in the location of the particular control of the vehicle with which it is desired to associate the control rod. It will be evident to those skilled in the art that my invention is not limited to use in conjunction with the clutch lever as it may also be applied to operate the throttle valve, governor, or any other like control of the engine.

The operation of a tractor having my invention applied thereto is illustrated under two different circumstances in Figs. 5 and 6. In the former, the tractor is shown as about to ascend a steep incline having a deep sand or other poor road surface. The rod connected to the draw bar 5 exerts a pull on the coupling device so as to maintain the same in substantially its original position regardless of the position assumed by the frame of the tractor. When the front of the tractor rises, a forward thrust is exerted upon the rod 16 by reason of the fact that the coupling device 10 remains stationary. This forward thrust acts through the bell crank lever 17 to exert a downward pull on the control rod 23 causing the roller 25 to contact with clutch lever 30 and to throw the clutch out of operative position thereby breaking the driving connection between the engine and the rear wheels and permitting the return of the front end of the vehicle to the ground before the same has been raised sufficiently high to do any damage.

In Fig. 6 the rear wheels of the tractor are illustrated as located in a ditch, as frequently happens when the rear wheels sink in soft or marshy ground. In this case it may be necessary to detach the draw bar 5 from the coupling device, in which case the extension 11 which projects beyond the rear wheels will rest upon the flat surface of the ground and maintain the coupling device in substantially horizontal position as shown in full lines. It will be evident that the action in this case will be similar to that above described in connection with the incline, and a forward thrust will be exerted upon the rod 16 for the purpose of moving the control rod 23 downwardly and engaging the clutch lever 30.

Having described my invention, what I claim as new and desire to secure by Letters Patent, is:—

1. In a motor propelled tractor having a frame, power transmitting mechanism between the motor and driving wheels, a clutch in said transmitting mechanism and means for controlling said clutch; a coupling device pivotally mounted on said frame, a rod adjacent to said means having a roller adjustably mounted thereon for engaging said means and actuating said clutch, and connections from said coupling device to said rod for actuating said rod in accordance with the movements of the coupling device relatively to said frame.

2. The combination with a motor propelled vehicle having a frame, a coupling block secured to the frame, a control device for the vehicle, and means for manually actuating said device, of a coupling device pivotally connected to said block having an extension to which the load may be attached, and a lug, a rod adjacent and adapted to operate said means, and connections between said coupling device and rod for actuating the latter in accordance with the movements of said coupling device relatively to the frame, including a rod pivotally connected to said lug.

3. In a motor propelled tractor the combination with a frame of the vehicle having a coupling block secured thereto, and a control device for the vehicle, of a coupling device pivotally connected to said block having an extension provided with a bearing surface of relatively large area, a control rod adapted to reciprocate vertically for contacting with and actuating said control device, and means connecting said control rod and coupling device whereby when the rear wheels of the tractor become located in a ditch said extension contacting with the ground automatically moves the coupling device relatively to the frame and actuates said means and control rod for operating said control device.

In testimony whereof I have hereunto set my hand in presence of two subscribing witnesses.

FRANK E. MEKAN.

Witnesses:
W. C. Dieckman,
Fred Crane.